United States Patent
O'Boyle et al.

(10) Patent No.: US 11,137,759 B2
(45) Date of Patent: Oct. 5, 2021

(54) SYSTEMS AND METHODS OF LEVEL 2 AUTONOMOUS VEHICLE DRIVING ON MULTIPLY DIGITIZED ROADS

(71) Applicants: Michael E O'Boyle, Howell, MI (US); Gerald L Sielagoski, St. Clair Shores, MI (US)

(72) Inventors: Michael E O'Boyle, Howell, MI (US); Gerald L Sielagoski, St. Clair Shores, MI (US)

(73) Assignee: FCA US LLC, Auburn Hills, MI (US)

( * ) Notice: Subject to any disclaimer, the term of this patent is extended or adjusted under 35 U.S.C. 154(b) by 314 days.

(21) Appl. No.: 16/437,146

(22) Filed: Jun. 11, 2019

(65) Prior Publication Data

US 2020/0393829 A1    Dec. 17, 2020

(51) Int. Cl.
*G05D 1/00* (2006.01)
*B60W 50/08* (2020.01)
*G06K 9/00* (2006.01)

(52) U.S. Cl.
CPC ......... *G05D 1/0061* (2013.01); *B60W 50/082* (2013.01); *G06K 9/00798* (2013.01); *B60W 2552/05* (2020.02); *G05D 2201/0213* (2013.01)

(58) Field of Classification Search
CPC ........ G05D 1/0061; G05D 2201/0213; B60W 2050/007; B60W 50/0097; B60W 2552/00; B60W 2552/20; B60W 2552/05; B60W 2552/15; B60W 50/082; B60W 2556/50; B60W 2555/60; B60W 2556/40; G08G 1/096725; G01C 21/3819; G06K 9/00798; G06K 2209/27; G06K 9/00818
See application file for complete search history.

(56) References Cited

U.S. PATENT DOCUMENTS

| | | | |
|---|---|---|---|
| 5,684,696 A | 11/1997 | Rao et al. | |
| 8,818,608 B2 | 8/2014 | Cullinane et al. | |
| 2013/0328861 A1 | 12/2013 | Arikan et al. | |
| 2016/0321924 A1* | 11/2016 | Lewis | B60W 30/02 |
| 2018/0113460 A1 | 4/2018 | Koda et al. | |
| 2018/0292833 A1* | 10/2018 | You | G05D 1/0088 |
| 2019/0004539 A1 | 1/2019 | Yu et al. | |
| 2020/0040193 A1* | 2/2020 | Fittipaldi | B32B 29/00 |

* cited by examiner

*Primary Examiner* — Kenneth J Malkowski
(74) *Attorney, Agent, or Firm* — Ralph E Smith

(57) ABSTRACT

Autonomous driving techniques comprise determining a Form of Way (FOW) classification of a road along which a vehicle is traveling and when the determined FOW classification is FOW 1 or FOW 9, permitting level 2 autonomous driving of the vehicle. When the determined FOW classification is FOW 2, the techniques determine whether a set of operating conditions relating to autonomous driving satisfies a set of criteria that assesses a set of upcoming stubs along a future section of the road along which the vehicle will potentially travel are satisfied and when the set of criteria are satisfied, permitting level 2 autonomous driving of the vehicle and when the set of criteria are not initially satisfied or are subsequently no longer satisfied, not permitting or at least temporarily interrupting level 2 autonomous driving of the vehicle.

20 Claims, 6 Drawing Sheets

SYSTEMS AND METHODS OF LEVEL 2 AUTONOMOUS VEHICLE DRIVING ON MULTIPLY DIGITIZED ROADS

FIELD

The present application generally relates to autonomous vehicle driving and, more particularly, to systems and methods of level 2 autonomous vehicle driving on multiply or separately digitized roads.

BACKGROUND

Level 2 autonomous driving refers to partial driving automation where a vehicle provides assistance to steer, accelerate, and brake in certain circumstances, but a driver is always required to supervise the driving task. Level 2 autonomous driving could include, for example, a combination of adaptive cruise control and lane centering. Level 2 autonomous driving is often limited to certain types of roads, such as specific freeways and controlled access roads having defined entrance and exit ramps. The ERTICO ADASIS V2 protocol classifies these types of roads as Form-Of-Way (FOW) 1 and FOW 9 roads. Level 2 autonomous driving would also be desirable for use on multiply digitized roads, which are also identified as FOW 2 roads in the ERTICO ADASIS V2 protocol.

In a FOW 2 road, each side of the road is separately digitized and there is some sort of divider (a physical barrier, a curbed island area, a ditch, etc.) similar to a FOW 1 road. Additionally, a FOW 2 road may be punctuated by road crossings, traffic lights, or stub roads that butt up against the road and allow traffic to enter the roadway. A highway having a crossing road is one example of a FOW 2 road. Thus, while conventional autonomous driving systems do work well for their intended purpose, there remains a desire for improvement in the relevant art.

SUMMARY

According to one example aspect of the invention, an autonomous driving system for a vehicle is presented. In one exemplary implementation, the system comprises: a set of sensors configured to monitor a set of operating conditions relating to autonomous driving, a digitized maps module that stores digitized maps based on a defined protocol, and a controller configured to: determine a Form of Way (FOW) classification of a road along which the vehicle is traveling using the digitized maps module, when the determined FOW classification is FOW 1 or FOW 9, permit level 2 autonomous driving of the vehicle, when the determined FOW classification is FOW 2, determine whether the set of operating conditions satisfies a set of criteria, wherein the set of criteria assesses a set of upcoming stubs along a future section of the road along which the vehicle will potentially travel, when the set of operating conditions satisfies the set of criteria, permit level 2 autonomous driving of the vehicle, when the set of operating conditions fails to satisfy or no longer satisfies the set of criteria, not permit or at least temporarily interrupt level 2 autonomous driving of the vehicle, and when the determined FOW classification is none of FOW 1, FOW 2, and FOW 9 or the FOW classification of the road is otherwise indeterminable, not permit or disable level 2 autonomous driving of the vehicle.

In some implementations, the set of criteria includes a quantity of stubs in the set of stubs or a frequency of the set of stubs across a time period or distance being less than a quantity or frequency threshold. In some implementations, the set of criteria further includes a speed limit of the road derived from the digitized maps module or from a camera of the vehicle that reads speed signs being greater than a speed limit threshold. In some implementations, the set of criteria further includes at least one of a time and a distance until the vehicle reaches a first stub of the set of stubs being greater than respective thresholds. In some implementations, at least temporarily interrupting level 2 autonomous driving includes alerting a driver of the vehicle.

In some implementations, the controller is configured to resume level 2 autonomous driving after the temporary interruption in response to an action by the driver. In some implementations, at least temporarily interrupting level 2 autonomous driving includes at least temporarily disabling level 2 autonomous driving. In some implementations, the level 2 autonomous driving of the vehicle comprises a combination of adaptive cruise control (ACC) and lane centering. In some implementations, the road is classified as FOW 2 when it has two sides that are multiply or separately digitized and are divided by a physical barrier. In some implementations, the defined protocol the ERTICO ADASIS V. 2.0 protocol.

According to another example aspect of the invention, an autonomous driving method for a vehicle is presented. In one exemplary implementation, the method comprises: determining, by a controller of the vehicle and utilizing a digitized maps module that stores digitized maps based on a defined protocol, a Form of Way (FOW) classification of a road along which the vehicle is traveling, when the determined FOW classification is FOW 1 or FOW 9, permitting, by the controller, level 2 autonomous driving of the vehicle, when the determined FOW classification is FOW 2, determining, by the controller, whether a set of operating conditions relating to autonomous driving satisfies a set of criteria, wherein the set of criteria assesses a set of upcoming stubs along a future section of the road along which the vehicle will potentially travel, when the set of operating conditions satisfies the set of criteria, permitting, by the controller, level 2 autonomous driving of the vehicle, when the set of operating conditions fails to satisfy or no longer satisfies the set of criteria, not permitting or at least temporarily interrupting, by the controller, level 2 autonomous driving of the vehicle, and when the determined FOW classification is none of FOW 1, FOW 2, and FOW 9 or the FOW classification of the road is otherwise indeterminable, not permitting or disabling, by the controller, level 2 autonomous driving of the vehicle.

In some implementations, the set of criteria includes a quantity of stubs in the set of stubs or a frequency of the set of crossing roads across a time period or distance being less than a quantity or frequency threshold. In some implementations, the set of criteria further includes a speed limit of the road derived from the digitized maps module or from a camera of the vehicle that reads speed signs being greater than a speed limit threshold. In some implementations, the set of criteria further includes at least one of a time and a distance until the vehicle reaches a first stub of the set of stubs being greater than respective thresholds. In some implementations, at least temporarily interrupting level 2 autonomous driving includes alerting a driver of the vehicle.

In some implementations, the controller is configured to resume level 2 autonomous driving after the temporary interruption in response to an action by the driver. In some implementations, at least temporarily interrupting level 2 autonomous driving includes at least temporarily disabling level 2 autonomous driving. In some implementations, the level 2 autonomous driving of the vehicle comprises a combination of adaptive cruise control (ACC) and lane centering. In some implementations, the road is classified as FOW 2 when it has two sides that are multiply or separately digitized and are divided by a physical barrier. In some implementations, the defined protocol is the ERTICO ADASIS V. 2.0 protocol.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1A:
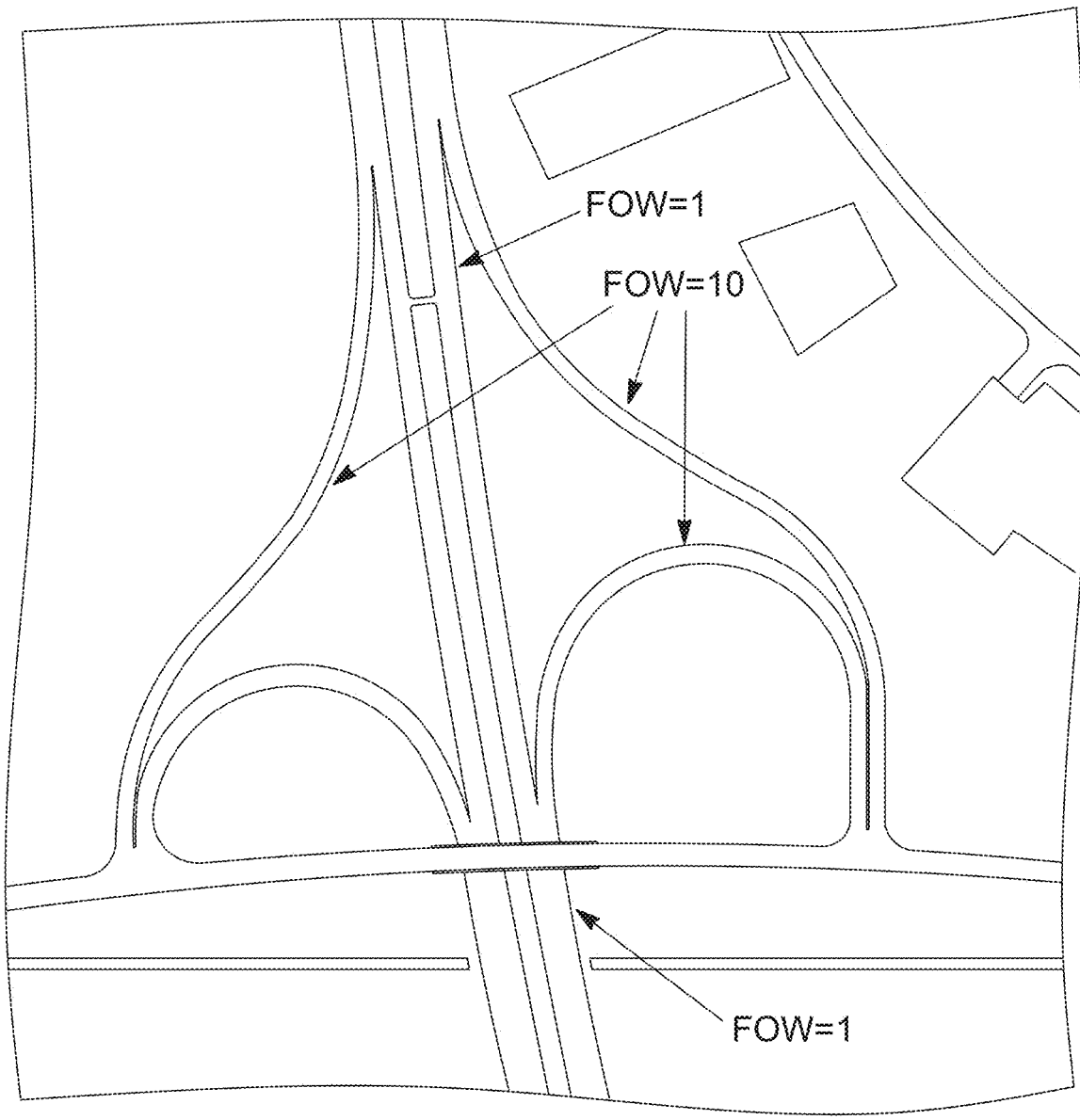
FIGS. 1A-1D illustrate example overhead views of Form-Of-Way (FOW) 1, FOW 2, FOW 3, FOW 9, and FOW 10 classified roads according to the principles of the present disclosure.
Figure 1B:
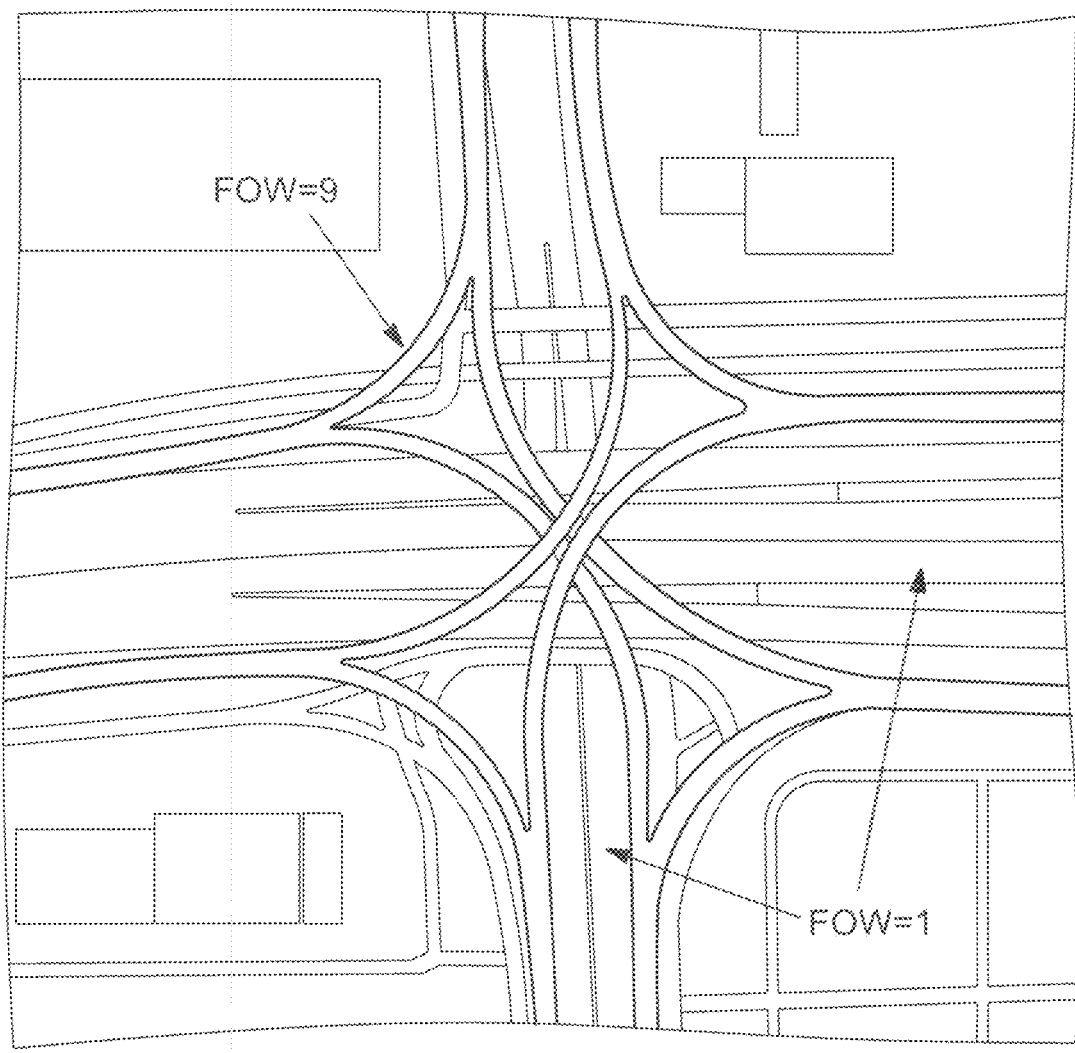

FIGS. 1A-1D illustrates overhead views of example Form of Way (FOW) 1, 2, 9, and 10 classified roads per the ERTICO ADASIS V2 protocol. These are merely examples and the various FOW road classifications could have many different appearances. Referring first to FIG. 1A, FOW 1 and FOW 10 classified road portions are illustrated. The FOW 1 road portion is a controlled access freeway or interstate where the road is separated by a physical barrier, where each side of the roadway is digitized separately, and where the driver needs to travel over a defined or controlled access entrance or exit ramp in order to enter or exit the freeway. The FOW 10 road portion is the controlled access entrance and exit ramps of the FOW 1 road portion. Level 2 autonomous driving is appropriate for the FOW 1 road portion but is not allowed for the FOW 10 road portion because the driver needs to be in control of the entry or exit of the vehicle to/from the FOW 1 road portion via the FOW 10 portion. FIG. 1B illustrates an interchange between FOW 1 classified road portions in addition to FOW 9 classified road portions. The FOW 9 road portions are transitional ramps between different FOW 1 road portions that permit traffic to pass from one FOW 1 road to another FOW 1 road without crossing traffic streams. Level 2 autonomous driving is appropriate for the FOW 9 road portions as well as the FOW 1 road portions because such a series of road portions (FOW 1→FOW 9→FOW 1) is essentially the same as continuous travel along a FOW 1 road portion.

Figure 1C:
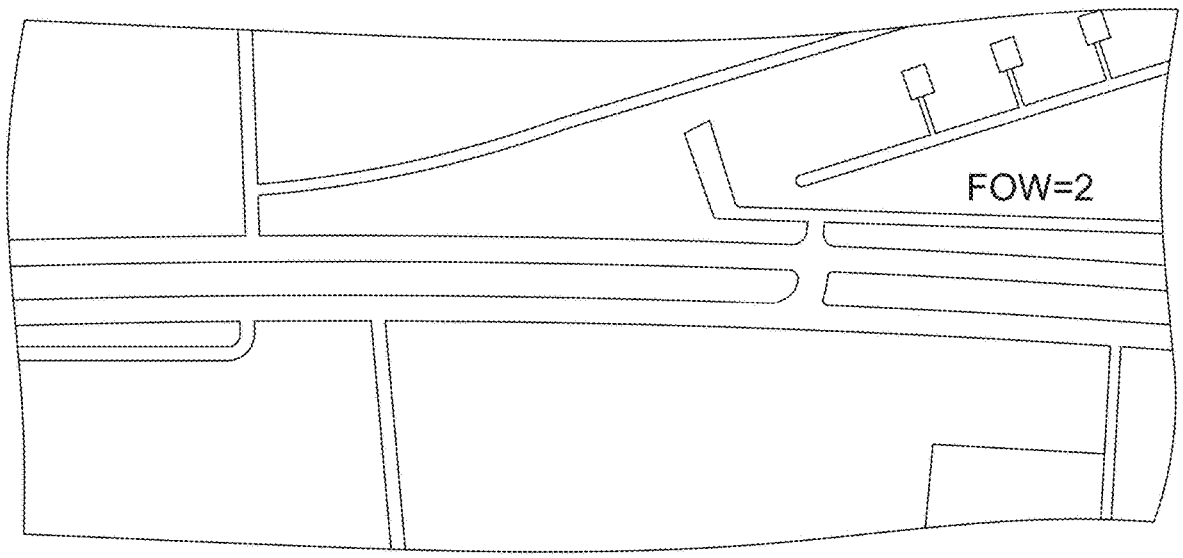
Figure 1D:
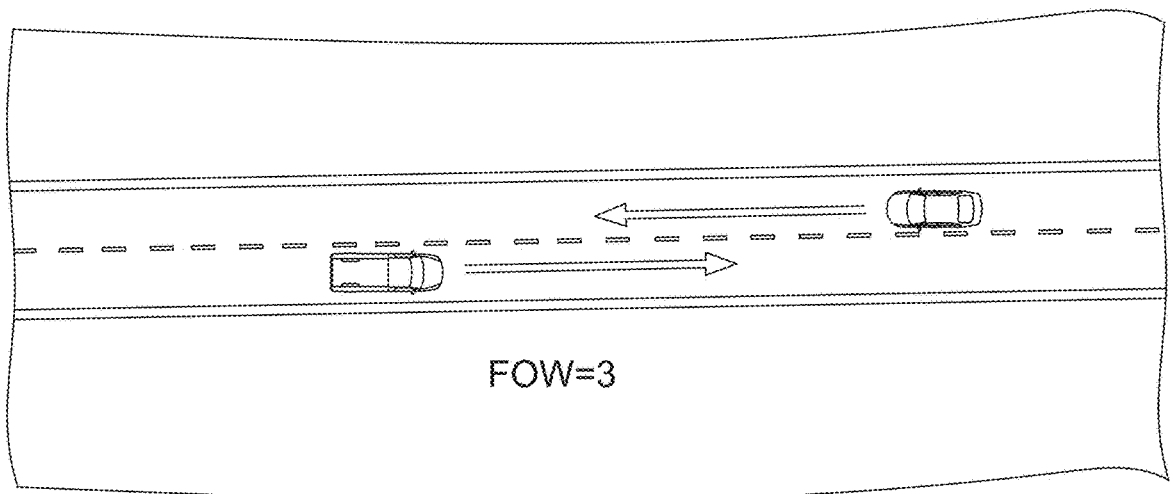

FIG. 1C illustrates a FOW 2 classified road portion where there are two sides of the road that are multiply or separately digitized (e.g., separately stored and identifiable in a map system), some sort of divider therebetween (a physical barrier, a curbed island, a ditch, etc.), and potentially some crossing roads therealong. Level 2 autonomous driving would appropriate for some FOW 2 road portions, such as those having high speed limits and few or no crossing roads where the number of possible and probably situations is limited or lower than on other FOW 2 road portions. Some systems, however, typically do not permit any level 2 autonomous driving on FOW 2 classified roads. This approach involves "geo-fencing" that only permits level 2 autonomous driving in areas that are well-known to be FOW 1 and FOW 9 classified road portions. Lastly, FIG. 1D illustrates a FOW 3 classified road portion, the best example of which is a typical undivided two-lane road portion. Level 2 autonomous driving is not appropriate on FOW 3 roads because the vehicles could potentially steer into the neighboring and opposing lane and into the path of oncoming vehicles.

Figure 2:
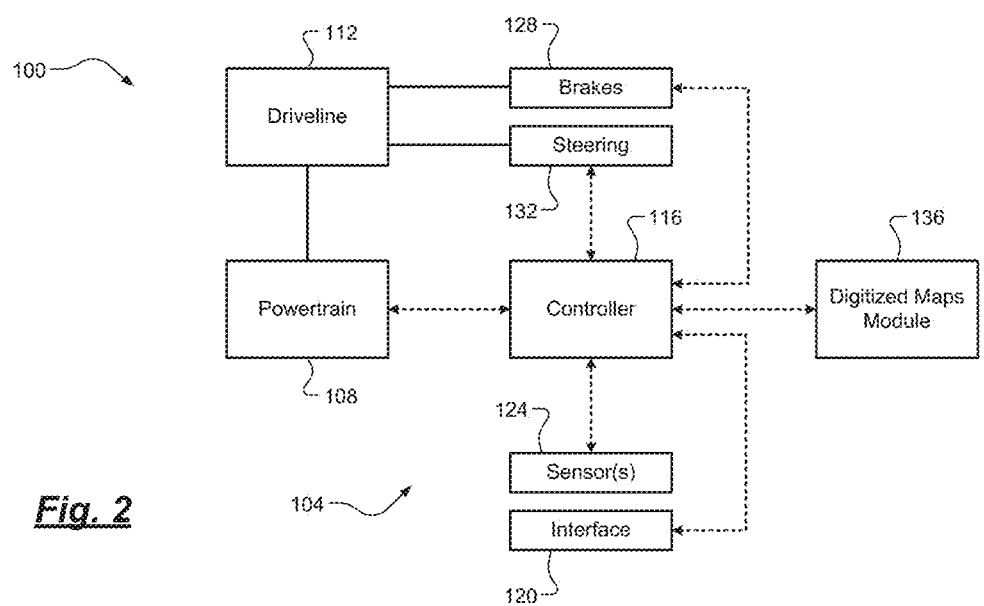
FIG. 2 is a functional block diagram of a vehicle having an example autonomous driving system according to the principles of the present disclosure.

Accordingly, improved autonomous driving systems and methods that provide for at least temporary level 2 autonomous driving on FOW 2 classified roads are presented. The extension of level 2 autonomous driving to FOW 2 road portions will allow for autonomous vehicle operation as most drivers would expect and thus could potentially improve the driver experience. Referring now to FIG. 2, a functional block diagram of a vehicle 100 having an example autonomous driving system 104 according to the principles of the present disclosure is illustrated. The vehicle 100 comprises a powertrain (e.g., an engine, an electric motor, or some combination thereof) that generates drive torque and transfers it to a driveline 112 to propel the vehicle 100. A controller 116 controls operation of the vehicle 100, e.g., based on driver input via an interface 120 and/or measurements or information from a set of one or more sensors 124 or similar devices (including, but not limited to, exterior cameras, radio detection and ranging (RADAR), light detection and ranging (LIDAR), vehicle speed sensors, a transceiver or radio receiving information, such as the FOW road classification, etc.). In addition to an accelerator pedal, brake pedal, and steering wheel, the interface 120 could further include, for example, a driver-facing camera, steering wheel hand contact sensors, steering torque sensing, and haptic, visual, and audible indications/alerts. A brake system 128 applies a braking force to the driveline 112 to decrease the speed of the vehicle 100 and a steering system 132 controls steering of the vehicle 100. The controller 116 can also request torque from the powertrain, in order to increase the speed of the vehicle 100.

The autonomous driving system 104 generally comprises the controller 116, the interface 120, the sensor(s) 124, the brake system 128, the steering system 132, the powertrain system 108, a GPS location/map matching system, and a digitized maps module 136. Level 2 autonomous driving could comprise, for example only, a combination of adaptive cruise control (ACC) where the controller 116 controls acceleration and braking to maintain a desired speed and a desired distance from nearby vehicles and lane centering where the controller 116 controls steering to maintain the vehicle 100 traveling down the center of a lane of the road. It will be appreciated that level 2 autonomous driving could include combinations of additional or different features. It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed, cause the controller to perform a set of operations corresponding to at least a portion of the techniques of the present disclosure. The one or more processors could be either partitioned within a single processor or two or more processors operating in a parallel or distributed architecture.

The digitized maps module 136, which could be part of a memory of the controller 116 or a separately accessible module, stores digitized maps that are primarily utilized to determine distances to upcoming crossing roads or stubs, which is described in greater detail below. The stored maps in the digitized maps module 136 could also include road classifications according to the ERTICO ADASIS V2 protocol.

Figure 3:
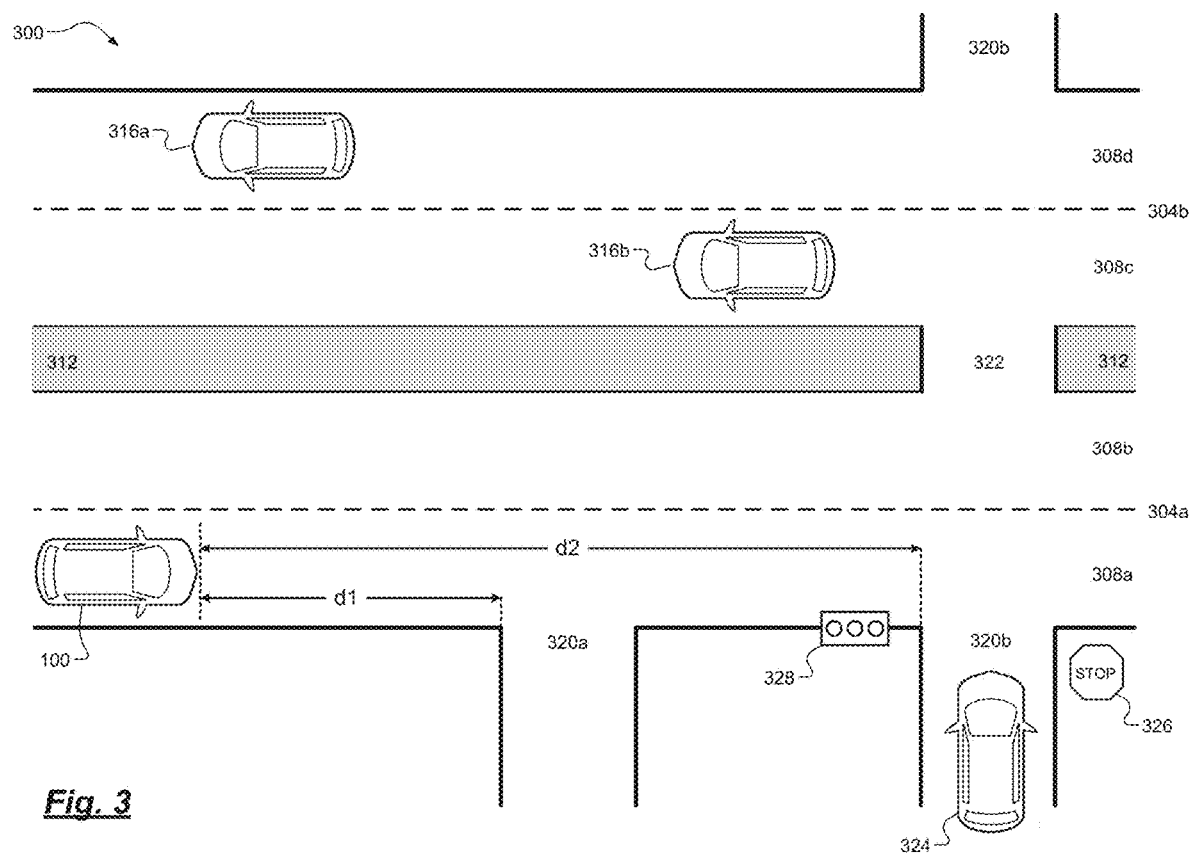
FIG. 3 is an example overhead view of a vehicle traveling along a FOW 2 classified road portion according to the principles of the present disclosure.

Referring now to FIG. 3, an example overhead view of the vehicle 100 traveling along a FOW 2 classified road portion 300 is illustrated. The FOW 2 road portion comprises first and second multiply or separately digitized roads 304a and 304b, respectively. First road 304a comprises two first lanes 308a and 308b and is for travel in a first direction (right). Second road 304b comprises two second lanes 308c and 308d and is for travel in an opposing second direction (left). The first and second road 304a and 304b are separated by divider 312 (a physical barrier, a curbed island, a ditch, etc.). As shown, vehicle 100 is traveling in the first direction (right) along first lane 308a of first road 304a and other vehicles 316a and 316b are traveling in the opposing second direction (left) along second lanes 308d and 308c, respectively, of second road 304b. The FOW 2 road 300 further comprises first and second stubs 320a and 320b. While the first stub 320a only connects to first road 304a, the second stub 320b is a crossing road that crosses over both the first and second roads 304a, 304b via a gap 322 in the divider 312. As shown, yet another vehicle 324 is waiting at a stop sign or traffic light 326 to turn onto the first road 304a or to cross the first road 304a and turn onto the second road 304b via the gap 322, or to cross both the first and second roads 304a, 304b and there is also another traffic light or stop sign 328 along the first road 304a at the second stub 320b. Thus, vehicle 324 could interfere with vehicle 100 or vice-versa. More specifically, if level 2 autonomous driving were on a conventional vehicle in place of vehicle 100 and/or vehicle 324 and its driver(s) was/were not paying attention or was/were distracted and vehicle 324 turned onto first road 304a or crossed the first road 304a, the conventional autonomous driving system could pass directly through an intersection or a grade crossing and vehicle 100 could strike vehicle 324 or vehicle 324 could strike vehicle 100, especially if vehicle 100 were passing through a red traffic signal (e.g., by traffic light 328) without stopping.

The autonomous driving system 104 of vehicle 100 monitors distance d1 to the first stub 320a and distance d2 to the second stub 320b (also referred to as stub offsets) using digitized maps from the digitized maps module 136. A distance that the vehicle 100 has already traveled along road 304a (also referred to as a vehicle offset) and distances of stubs 320a, 320b from the start of road 304a (also referred to as stub offsets) could be determined. For example, distance d2 to the second stub 320b could be calculated by subtracting this vehicle offset from the stub offset for the second stub 320b, and then the time to reach the second stub 320b could be determined based on the calculated distance d2 and the vehicle speed. The digitized maps module 136 is utilized because the distance to a next stub could be very far away (e.g., miles away) and thus could not be sensed by sensor(s) 124. The autonomous driving system 104 could also monitor (e.g., using sensor(s) 124) distances to other objects, such a distance to traffic light or stop sign 328. For example, the distance traffic light or sign 328 could be indicative of how far the vehicle 100 has until potential obstacles could be encountered. Based on the known speed of the vehicle 100, the times for it to reach these various points is also determinable. The autonomous driving system 104 also calculates or determines a set of crossing roads that the vehicle 100 will encounter in a future period, which could also be described as a crossing road quantity or frequency (e.g., one crossing road every 1000 feet or every 2 seconds).

Based on the times, distances, and/or the quantity or frequency of upcoming crossing roads, the autonomous driving system 104 could permit level 2 autonomous driving, could temporarily interrupt ongoing level 2 autonomous driving, or could not permit or could disable ongoing or future level 2 autonomous driving. The speed of the vehicle 100 also could be a primary factor in whether level 2 autonomous driving is permitted. For example, level 2 autonomous driving could be limited only to roads having speed limits greater than speed limit threshold, which are more characteristic of highways remote from urban areas where fewer stubs can be expected. The speed limit can be derived from the digitized maps in the digitized maps module 136 or from a camera (e.g., sensor(s) 124) that reads speed limit signs. In one exemplary implementation, the autonomous driving system 104 permits level 2 autonomous driving when the quantity or frequency of crossing loads is less than a quantity or frequency threshold. The autonomous driving system 104 could further require that the time and/or distance to the next crossing road (i.e., crossing road 320a) is greater than respective thresholds. These various conditions are also referred to herein as a "set of criteria for level 2 autonomous driving." When any of the set of criteria are not satisfied, level 2 autonomous driving is either not permitted or is disabled or is at least temporarily interrupted. It will be appreciated that other information could also be leveraged in determining whether or not to permit level 2 autonomous driving, such as a current destination and corresponding route from the vehicle's navigation/global positioning satellite (GPS) system.

Temporary interruption of the level 2 autonomous driving could include alerting the driver of the vehicle 100 and/or temporarily disabling at least some of the level 2 autonomous driving functionality, thereby forcing the driver to assume more control of the vehicle 100. For example only, ACC operation could continue but lane centering could be at least temporarily disabled. Alternatively, both functionalities could be at least temporarily disabled. The alerts provided to the driver could be audible, visual, and/or haptic alerts and are provided via the interface 120. For example only, the alerts could instruct the driver to perform specific action(s) in order to maintain level 2 autonomous driving. This could include, for example only, instructing the driver to take control of the steering wheel and/or instructing the driver to move their visual focus to the scene in front of the vehicle 100 (e.g., if they were looking elsewhere, such as looking downward at a mobile device). Other actions could also be required, such as a touch input by the driver confirming that they are aware of the upcoming crossing roads that could require their intervention into the level 2 autonomous driving. If the required action is not taken by the driver, the autonomous driving system 104 could fully disable level 2 autonomous driving and could provide further alerts.

Figure 4:
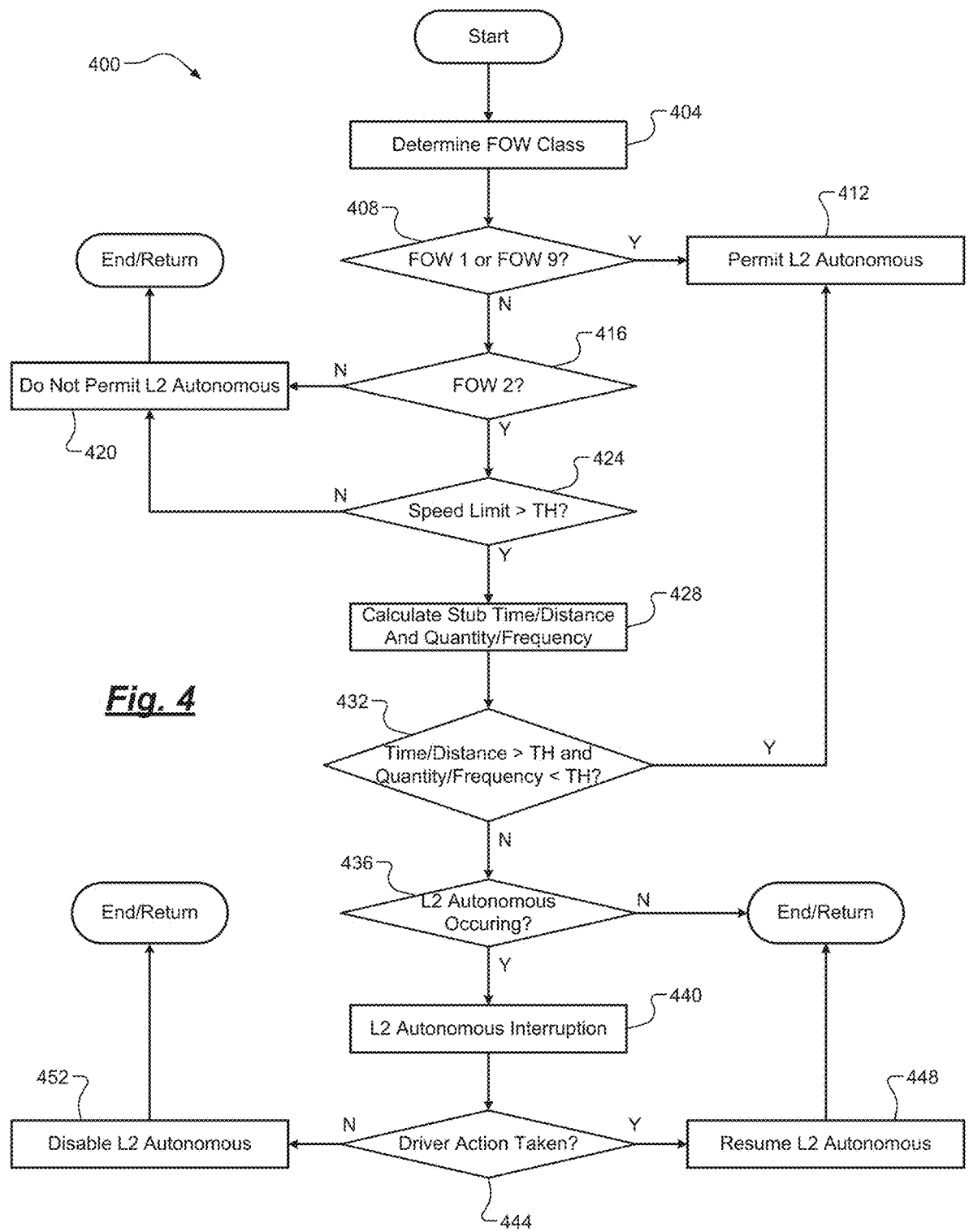
FIG. 4 is a flow diagram of an example autonomous driving method for a vehicle according to the principles of the present disclosure.

Referring now to FIG. 4, a flow diagram of an example autonomous driving method 400 according to the principles of the present disclosure is illustrated. At 404, the autonomous driving system 104 (i.e., the controller 116 together with a digitally stored map from the digitized maps module 136) determines a FOW classification of a road along which the vehicle 100 is traveling. At 408, the controller 116 determines whether the determined FOW classification of the road is FOW 1 or FOW 9. When true, the method 400 proceeds to 412 where the controller 116 permits level 2 autonomous driving and the method 400 ends/returns to the start. When the determined FOW classification of the road is not FOW 1 or FOW 9, the method 400 proceeds to 416. At 416, the controller 116 determines whether the determined FOW classification is FOW 2. When false, or when the FOW classification of the road is otherwise indeterminable, the method 400 proceeds to 420 where the controller 116 does not permit level 2 autonomous driving and the method 400 ends/returns. When the determined FOW classification of the road is FOW 2, the method 400 proceeds to 424.

At 424, the controller 116 determines whether the speed limit of the road is greater than a speed limit threshold. When true, the method 400 proceeds to 428. When false, the method 400 proceeds to 420 where the controller 116 does not permit level 2 autonomous driving and the method 400 ends/returns. At 428, the controller 116 calculates or determines at least one of a time and a distance to the next crossing road or stub that the vehicle 100 will encounter and a quantity or frequency of a set of crossing roads or stubs that the vehicle 100 will encounter in a future time or distance. These calculations could take into account, for example only, vehicle speed, vehicle path, vehicle length, an angle at which the crossing road or stub meets the road, and a FOW classification of the crossing road or stub. At 432, the controller 116 determines whether at least one of the time and distance until the next crossing road or stub is greater than respective time/distance thresholds and whether the quantity or frequency of the set of crossing roads or stubs is less than a quantity or frequency threshold.

When true, the method 400 proceeds to 412 where the controller 116 permits level 2 autonomous driving. Otherwise, the method 400 proceeds to 436 where the controller 116 determines whether level 2 autonomous driving is currently occurring. When false, the method 400 ends/returns. When true, the method 400 proceeds to 440 where the controller 116 at least partially interrupts level 2 autonomous driving, such as providing driver alert(s) and/or disabling at least some level 2 autonomous driving functionality. At optional 444, the controller 116 determines whether a required driver action was taken such that level 2 autonomous driving can resume. When true, the method 400 proceeds to 448 where the controller 116 resumes level 2 autonomous driving and the method 400 ends/returns. When false, however, the method 400 proceeds to 452 where the controller 116 fully disables level 2 autonomous driving and optionally provides further driver alert(s) and the method 400 ends/returns.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An autonomous driving system for a vehicle, the system comprising:
    a set of sensors configured to monitor a set of operating conditions relating to autonomous driving;
    a digitized maps module that stores digitized maps based on a defined protocol; and
    a controller configured to:
        determine a Form of Way (FOW) classification of a road along which the vehicle is traveling using the digitized maps module;
        when the determined FOW classification is FOW 1 or FOW 9, permit level 2 autonomous driving of the vehicle;
        when the determined FOW classification is FOW 2, determine whether the set of operating conditions satisfies a set of criteria, wherein the set of criteria assesses a set of upcoming stubs along a future section of the road along which the vehicle will potentially travel;
        when the set of operating conditions satisfies the set of criteria, permit level 2 autonomous driving of the vehicle;
        when the set of operating conditions fails to satisfy or no longer satisfies the set of criteria, not permit or at least temporarily interrupt level 2 autonomous driving of the vehicle; and
        when the determined FOW classification is none of FOW 1, FOW 2, and FOW 9 or the FOW classification of the road is otherwise indeterminable, not permit or disable level 2 autonomous driving of the vehicle.

2. The system of claim 1, wherein the set of criteria includes a quantity of stubs in the set of stubs or a frequency of the set of stubs across a time period or distance being less than a quantity or frequency threshold.

3. The system of claim 1, wherein the set of criteria further includes a speed limit of the road derived from the digitized maps module or from a camera of the vehicle that reads speed signs being greater than a speed limit threshold.

4. The system of claim 1, wherein the set of criteria further includes at least one of a time and a distance until the vehicle reaches a first stub of the set of stubs being greater than respective thresholds.

5. The system of claim 1, wherein at least temporarily interrupting level 2 autonomous driving includes alerting a driver of the vehicle.

6. The system of claim 1, wherein the controller is configured to resume level 2 autonomous driving after the temporary interruption in response to an action by the driver.

7. The system of claim 1, wherein at least temporarily interrupting level 2 autonomous driving includes at least temporarily disabling level 2 autonomous driving.

8. The system of claim 1, wherein the level 2 autonomous driving of the vehicle comprises a combination of adaptive cruise control (ACC) and lane centering.

9. The system of claim 1, wherein the road is classified as FOW 2 when it has two sides that are multiply or separately digitized and are divided by a physical barrier.

10. The system of claim 1, wherein the defined protocol the ERTICO ADASIS V. 2.0 protocol.

11. An autonomous driving method for a vehicle, the method comprising:
    determining, by a controller of the vehicle and utilizing a digitized maps module that stores digitized maps based on a defined protocol, a Form of Way (FOW) classification of a road along which the vehicle is traveling;
    when the determined FOW classification is FOW 1 or FOW 9, permitting, by the controller, level 2 autonomous driving of the vehicle;
    when the determined FOW classification is FOW 2, determining, by the controller, whether a set of operating conditions relating to autonomous driving satisfies a set of criteria, wherein the set of criteria assesses a set of upcoming stubs along a future section of the road along which the vehicle will potentially travel;

when the set of operating conditions satisfies the set of criteria, permitting, by the controller, level 2 autonomous driving of the vehicle;

when the set of operating conditions fails to satisfy or no longer satisfies the set of criteria, not permitting or at least temporarily interrupting, by the controller, level 2 autonomous driving of the vehicle; and when the determined FOW classification is none of FOW 1, FOW 2, and FOW 9 or the FOW classification of the road is otherwise indeterminable, not permitting or disabling, by the controller, level 2 autonomous driving of the vehicle.

12. The method of claim 11, wherein the set of criteria includes a quantity of stubs in the set of stubs or a frequency of the set of crossing roads across a time period or distance being less than a quantity or frequency threshold.

13. The method of claim 11, wherein the set of criteria further includes a speed limit of the road derived from the digitized maps module or from a camera of the vehicle that reads speed signs being greater than a speed limit threshold.

14. The method of claim 11, wherein the set of criteria further includes at least one of a time and a distance until the vehicle reaches a first stub of the set of stubs being greater than respective thresholds.

15. The method of claim 11, wherein at least temporarily interrupting level 2 autonomous driving includes alerting a driver of the vehicle.

16. The method of claim 11, wherein the controller is configured to resume level 2 autonomous driving after the temporary interruption in response to an action by the driver.

17. The method of claim 11, wherein at least temporarily interrupting level 2 autonomous driving includes at least temporarily disabling level 2 autonomous driving.

18. The method of claim 11, wherein the level 2 autonomous driving of the vehicle comprises a combination of adaptive cruise control (ACC) and lane centering.

19. The method of claim 11, wherein the road is classified as FOW 2 when it has two sides that are multiply or separately digitized and are divided by a physical barrier.

20. The method of claim 11, wherein the defined protocol is the ERTICO ADASIS V. 2.0 protocol.

* * * * *